(12) United States Patent
Mesropyan et al.

(10) Patent No.: US 10,513,400 B1
(45) Date of Patent: Dec. 24, 2019

(54) METHOD AND SYSTEM OF REAL-TIME ANALYSIS AND MARKING OF A TARGET SURFACE USING A DIGITAL CAMERA COUPLED MARKING DEVICE

(71) Applicants: Ashot Mesropyan, Fremont, CA (US); Robert Neal French, Chillicothe, OH (US); Philip Lee Brooks, Chillicothe, OH (US); Aaron Lee Hampton, Hilliard, OH (US)

(72) Inventors: Ashot Mesropyan, Fremont, CA (US); Robert Neal French, Chillicothe, OH (US); Philip Lee Brooks, Chillicothe, OH (US); Aaron Lee Hampton, Hilliard, OH (US)

( * ) Notice: Subject to any disclaimer, the term of this patent is extended or adjusted under 35 U.S.C. 154(b) by 34 days.

(21) Appl. No.: 15/993,631

(22) Filed: May 31, 2018

(51) Int. Cl.
| | |
|---|---|
| *B65G 43/00* | (2006.01) |
| *B23K 26/364* | (2014.01) |
| *G06T 7/00* | (2017.01) |
| *G06T 7/73* | (2017.01) |
| *B41J 2/44* | (2006.01) |

(52) U.S. Cl.
CPC ............ *B65G 43/00* (2013.01); *B23K 26/364* (2015.10); *B41J 2/442* (2013.01); *G06T 7/74* (2017.01); *G06T 2207/10004* (2013.01); *G06T 2207/20081* (2013.01)

(58) Field of Classification Search
CPC .......... B65G 43/00; B23K 26/364; G06T 7/74
USPC ......................................................... 348/95
See application file for complete search history.

(56) References Cited

U.S. PATENT DOCUMENTS

| | | | |
|---|---|---|---|
| 5,215,864 | A | 6/1993 | Laakmann |
| 6,135,022 | A | 10/2000 | Troester |
| 6,565,415 | B1 | 5/2003 | Christiansen et al. |
| 6,793,140 | B2 | 9/2004 | Mazumder et al. |
| 7,191,529 | B2 | 3/2007 | Phipps et al. |
| 7,676,061 | B2 | 3/2010 | Harrison et al. |
| 8,280,099 | B2 | 10/2012 | Harrison et al. |
| 8,442,297 | B2 | 5/2013 | Tyler et al. |

(Continued)

FOREIGN PATENT DOCUMENTS

| | | |
|---|---|---|
| CN | 205736484 U | 11/2016 |
| WO | 2001081039 A1 | 11/2001 |

(Continued)

*Primary Examiner* — Jeffery A Williams
(74) *Attorney, Agent, or Firm* — LegalForce RAPC Worldwide

(57) ABSTRACT

Disclosed are a method and/or a system for real-time analysis and marking of a target surface using a digital camera coupled marking device. In one embodiment, a master controller receives a real-time digital camera signal from the digital camera of a marking device communicatively coupled to the master controller. The master controller analyzes the digital camera signal using an image recognition algorithm, a machine vision algorithm, and a database and archives a visual state and an object design parameter of an object. The master controller compares the visual state of an object with a library of known visual states in the database to extract an associated marking pattern and a desired marking location of the object. The master controller generates and sends a marking command to a pin marker of the marking device. The pin marker engraves the marking pattern onto the object in real time.

20 Claims, 9 Drawing Sheets

OVERVIEW OF TARGET SURFACE MARKING SYSTEM
150

(56) References Cited

U.S. PATENT DOCUMENTS

| | | | |
|---|---|---|---|
| 8,467,038 | B2 | 6/2013 | Decoux et al. |
| 8,502,850 | B2 | 8/2013 | Mesropyan et al. |
| 8,854,406 | B1 | 10/2014 | Mesropyan et al. |
| 8,903,516 | B2 | 12/2014 | Trzcinski et al. |
| 8,905,657 | B2 | 12/2014 | Grunenberg et al. |
| 8,906,596 | B2 | 12/2014 | Van De Sanden et al. |
| 9,124,780 | B2 | 9/2015 | Nielsen et al. |
| 9,421,598 | B2 | 8/2016 | Baud et al. |
| 9,555,662 | B2 | 1/2017 | Marcos et al. |
| 9,710,901 | B2 | 7/2017 | Seo et al. |
| 2003/0033104 | A1 | 2/2003 | Gooche |
| 2003/0102289 | A1 | 6/2003 | Nissels et al. |
| 2005/0180804 | A1 | 8/2005 | Andrew et al. |
| 2011/0135160 | A1* | 6/2011 | Sagan ................ G06K 9/00577 382/108 |
| 2016/0375709 | A1 | 12/2016 | Nguyen et al. |
| 2017/0023925 | A1 | 1/2017 | Sweet et al. |
| 2018/0018530 | A1 | 1/2018 | Laschi |
| 2018/0021751 | A1 | 1/2018 | Singh |

FOREIGN PATENT DOCUMENTS

| | | |
|---|---|---|
| WO | 2002022317 A1 | 3/2002 |
| WO | 2006088991 A2 | 8/2006 |
| WO | 2007138173 A1 | 12/2007 |
| WO | 2009015781 A2 | 2/2009 |
| WO | 2010034989 A1 | 4/2010 |
| WO | 2011076294 A1 | 6/2011 |
| WO | 2012001077 A1 | 1/2012 |
| WO | 2012037549 A1 | 3/2012 |
| WO | 2014165332 A1 | 10/2014 |
| WO | 2015008742 A1 | 1/2015 |
| WO | 2016103285 A1 | 6/2016 |

* cited by examiner

| VISUAL SHAPE 306 | OBJECT DESIGN PARAMETER 308 | MARKING PATTERN 210 | DESIRED MARKING LOCATION 310 | MARKING COMMAND 212 |
|---|---|---|---|---|
|  | LENGTH - ....m<br>WIDTH - ....m<br>HEIGHT - ....m | 123456 | X-COORDINATE - ....<br>Y-COORDINATE - ....<br>Z-COORDINATE - .... | MARKING COMMAND-1 |
| 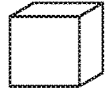 | LENGTH - ....m<br>WIDTH - ....m<br>HEIGHT - ....m | ABCDEF | X-COORDINATE - ....<br>Y-COORDINATE - ....<br>Z-COORDINATE - .... | MARKING COMMAND-2 |
| ⋮ | ⋮ | ⋮ | ⋮ | ⋮ |
|  | LENGTH - ....m<br>WIDTH - ....m<br>HEIGHT - ....m |  | X-COORDINATE - ....<br>Y-COORDINATE - ....<br>Z-COORDINATE - .... | MARKING COMMAND-n |

TABLE VIEW 550

FIG. 5

METHOD AND SYSTEM OF REAL-TIME ANALYSIS AND MARKING OF A TARGET SURFACE USING A DIGITAL CAMERA COUPLED MARKING DEVICE

FIELD OF TECHNOLOGY

This disclosure relates generally to marking devices and, more particularly, to a device, a method and/or a system for real-time analysis and marking of a target surface using a digital camera coupled marking device.

BACKGROUND

A marking device may permanently mark a surface to enable identification, traceability, origin and/or ownership indication. The marking system may have a pin marker and/or a laser marker to engrave information on different kinds of materials such as metals, organic materials, ceramics, glass, and/or plastics. The marking system may require placing a product at particular position to get marking at the desired marking surface and/or area. An inappropriate positioning of the product may result in erroneous placement of the mark on the desired marking surface.

Further it may be difficult to determine an ideal placement of the product if the position of the product is misplaced before marking. In addition, it may be difficult to identify and analyze a particular part from multiple components of the same product and mark accordingly on its desired marking surface.

SUMMARY

Disclosed are a device, a method and/or a system of real-time analysis and marking of a target surface using a digital camera coupled marking device.

In one aspect, a target surface marking system includes a master controller, a digital camera and a pin marker. The master controller with a processor and a memory analyzes a visual state of an object from a digital camera signal using an image recognition algorithm, a machine vision algorithm, a database, and a data library. The master controller compares a visual state of the object with a library of known visual states in the database. In addition, the master controller archives a visual shape and a design parameter of the object.

The master controller compares the visual state and the design parameter of the object with an archived shape and an archived design parameter selected from a set of previously marked objects. The master controller instantiates the machine vision algorithm to identify a corresponding shape and design patterns previously archived and stored in the data library of the database.

Further, the master controller compares a random position and a random orientation of the object with an archived parameter of a same shape and a same orientation of a similar object. The master controller extracts an associated marking pattern and a desired marking location of the object to ensure that the object on a conveyor system corresponds to a selected marking. The master controller sends a marking command to the pin marker.

The digital camera is communicatively connected to the master controller. The digital camera generates a visual signal of the visual state of the object to be marked in real time. The digital camera transmits the generated digital camera signal to the master controller in real time. The pin marker receives the marking command from the master controller. The pin marker marks the marking pattern onto the desired marking location of the target surface in real time.

The pin marker may have an array of pins in a dot matrix format. The pin marker may be a laser marker. The target surface marking system may further include a second camera, the digital camera to send a visual image of the marking target. The second camera may check a quality of an engraving and send the digital signal to the master controller in real time.

The target surface marking system may only allow the marking of a compliant object with a desired specific marking through the marking command. In addition, the target surface marking system may permit the compliant object to move in a forward path, along a primary belt. The object may not correspond to the marking command if the object on the primary belt is non-compliant. The target surface marking system may send a non-compliant signal to the conveyor system such that the conveyor system sends the non-compliant object to a bypass belt.

The machine learning algorithm may apply a neural network enhanced through a training data set which continuously learns and refines itself to improve quality of the pin marker engraving. The machine learning algorithm may reduce a duration of a marking operation of the pin marker. The machine vision algorithm may improve identification of different sizes and shapes. The objects of different shapes and sizes on the primary belt may be engraved with different corresponding associated marking patterns respectively in a single sequence through an application of correspondingly different pin marking commands. The digital camera may be embedded in the pin marker.

In another aspect, a method of a marking device to engrave on a target object includes generating a visual signal of a visual state of an object to be marked in real time using a digital camera. The method of the marking device to engrave on the target object includes transmitting of the visual signal to a master controller in real time using the digital camera. The method of the marking device to engrave on the target object includes analyzing the visual state of the object from the received digital camera signal using the master controller. The method of the marking device to engrave on the target object includes comparing the visual state of the object with a library of known visual states in a database and archiving a visual shape and a design parameter of the object using the master controller.

In addition, the method of the marking device to engrave on the target object includes comparing the visual state of the object with an archived shape and the design parameter of the previously marked object using the master controller. The method of the marking device to engrave on the target object includes comparing the random position and the random orientation of the object with the archived design parameter of the same shape and object using the master controller. The method of the marking device to engrave on the target object includes extracting the associated marking pattern and the desired marking location of the object using the master controller.

Further, the method of the marking device to engrave on the target object includes generating a marking command based on the marking pattern, the desired marking location, random position and random orientation of the object using processor of the master controller. The method of the marking device to engrave on the target object includes transmitting the marking command from the master controller to a pin marker of the marking device. The method of the marking device to engrave on the target object includes marking the marking pattern onto the desired marking location of the target object in real time using the pin marker.

The marking pattern to be marked on the object may be an image, a barcode, a label, a logo, a serial number and/or a text. The material of the target object may be a metal, a fiber, a wood, a glass, quartz, a ceramic, and/or steel. The marking device may be a dot peen marker and/or a scriber marker. The design parameter of the object may include shape, structure, size, length, width, depth, orientation and/or position of the object.

In yet another aspect, a target surface marking system includes a computing device, a master controller, and a marking device. The computing device provides a marking pattern to engrave on the target surface. The computing device transmits the marking pattern to the master controller. The master controller with a processor and a memory is coupled with the computing device. The master controller analyzes a visual state of an object from a digital camera signal using an image recognition algorithm, a machine vision algorithm, a database, and a data library. The master controller compares the visual state of the object with a library of known visual states in the database and to archive a visual shape and a design parameter of the object.

In addition, the master controller compares the visual state of the object with an archived shape and the archived design parameter selected from a set of previously marked objects. The master controller instantiates the machine vision algorithm to identify a corresponding shape and design patterns previously archived and stored in the data library of the database of the master controller. The master controller compares a random position and a random orientation of the object with an archived design parameter of a same shape and a same object.

Further, the master controller receives the marking pattern from the computing device in real time. The master controller generates a marking command using the image recognition algorithm and the machine vision algorithm based on the position and the orientation of the object. The master controller sends the marking command to a pin marker.

The marking device includes a digital camera and the pin marker. The digital camera of the marking device generates a visual signal of the visual state of the object to be marked in real time. The digital camera of the marking device transmits the generated digital camera signal in real time to the master controller. The pin marker of the marking device receives the marking command from the master controller for marking the target surface. The pin marker of the marking device marks the marking pattern onto the desired marking location of the target object in real time.

The computing device may be a computer, a mobile device, a keyboard, and/or a touch-screen device to provide the marking pattern in the form of an image, a barcode, a label, a logo, a serial number and/or a text. The digital camera may capture a pre-engraved marking pattern from the object on a conveyor system in real time while the object is being marked. For example, the digital camera may capture in real time the pre-engraved marking pattern and send it to the master controller for comparison with an ideal marking pattern as the marking device continues to mark to ensure accuracy and quality of marking. The digital camera may further transmit the captured pre-engraved marking pattern to the master controller for marking the same pre-engraved marking pattern on the objects having same visual shape and a design parameter.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 5 is a table view illustrating the archived characteristics of the objects in a database of the master controller of FIG. 1, according to one embodiment.

Figure 1:
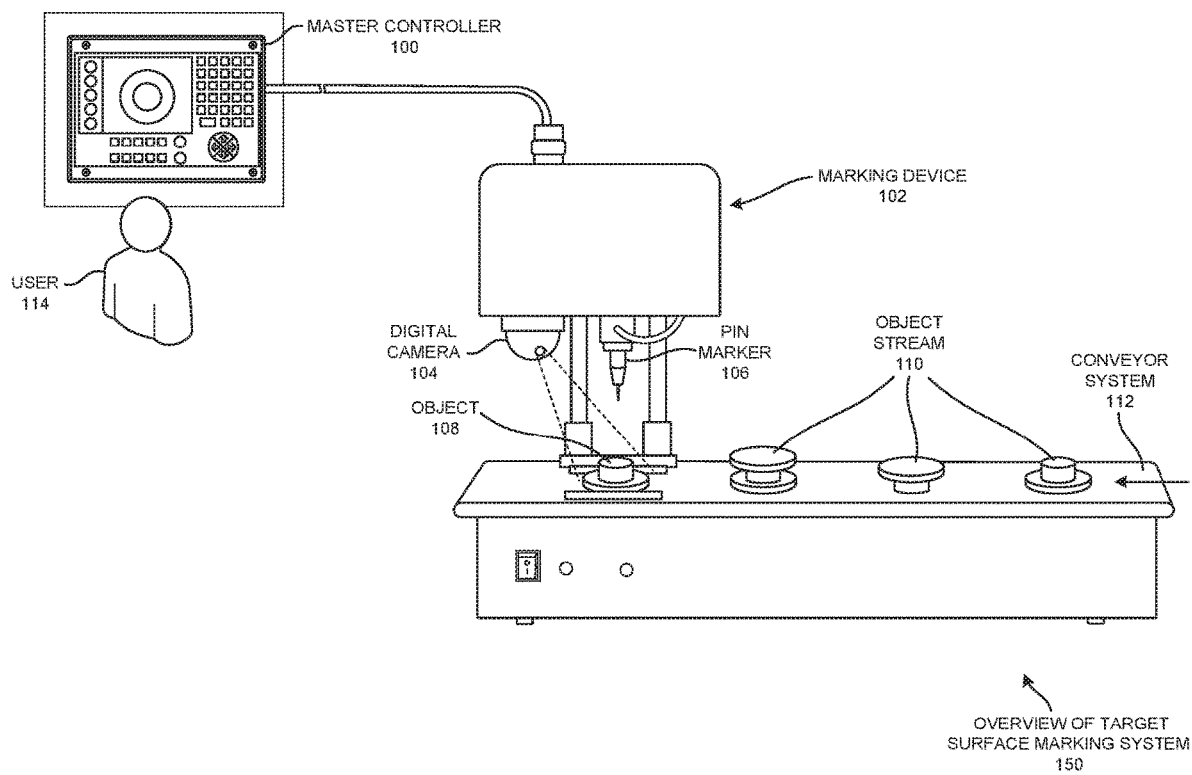
FIG. 1 is an overview of a target surface marking system to engrave a marking pattern onto an object using a master controller and a digital camera coupled marking device, according to one embodiment.

Other features of the present embodiments will be apparent from the accompanying drawings and from the detailed description that follows.

DETAILED DESCRIPTION

Disclosed is a device, a method and/or a system of real-time analysis and marking of a target surface (e.g., object 108) using a digital camera 104 coupled marking device 102. In one embodiment, a target surface marking system includes a master controller 100, a digital camera 104 and a pin marker 106. The master controller 100 with a processor 204 and a memory 202 analyzes a visual state of an object 108 from a digital camera signal 200 using an image recognition algorithm 300, a machine vision algorithm 302, a database 206, and a data library. The master controller 100 compares the visual state (e.g., visual shape 306 and object design parameter 308) of the object 108 with a library (e.g., data library) of known visual states in the database 206. In addition, the master controller 100 archives a visual shape 306 and an object design parameter 308.

The master controller 100 compares the visual shape 306 and the object design parameter 308 of the object 108 with an archived shape (e.g., visual shape 306) and an archived object design parameter 308 selected from a set of previously marked objects 108. The master controller 100 instantiates the machine vision algorithm 302 to identify a corresponding shape (e.g., visual shape 306) and design patterns (e.g., marking pattern 210) previously archived and stored in the data library of the database 206.

Further, the master controller 100 compares a random position and a random orientation of the object 108 with an archived parameter (e.g., object design parameter 308) of a same shape (e.g., visual shape 306) and a same orientation of a similar object 108. The master controller 100 extracts an associated marking pattern 210 and a desired marking location 310 of the object 108 to ensure that the object 108 on a conveyor system 112 corresponds to a selected marking (e.g., marking pattern 210). The master controller 100 sends a marking command 212 to the pin marker 106.

The digital camera 104 is communicatively connected to the master controller 100. The digital camera 104 generates a visual signal (e.g., digital camera signal 200) of the visual state of the object 108 to be marked in real time. The digital camera 104 transmits the generated digital camera signal 200 to the master controller 100 in real time. The pin marker 106 receives the marking command 212 from the master controller 100. The pin marker 106 marks the marking pattern 210 onto the desired marking location 310 of the target surface (e.g., object 108) in real time.

The pin marker 106 may have an array of pins in a dot matrix format. The pin marker 106 may be a laser marker. The target surface marking system may further include a second camera, the digital camera 104 to send a visual image (e.g., digital camera signal 200) of the marking target (e.g., object 108). The second camera (e.g., digital camera 104) may check a quality of an engraving and send the digital signal (e.g., digital camera signal 200) to the master controller 100 in real time.

The target surface marking system may only allow the marking of a compliant object 108 with a desired specific marking (e.g., marking pattern 210) through the marking command 212. In addition, the target surface marking system may permit the compliant object 108 to move in a forward path, along a primary belt (e.g., of the conveyor system 112). The object 108 may not correspond to the marking command 212 if the object 108 on the primary belt (e.g., of the conveyor system 112) is non-compliant. The target surface marking system may send a non-compliant signal to the conveyor system 112 such that the conveyor system 112 sends the non-compliant object 108 to a bypass belt.

The machine learning algorithm 304 may apply a neural network enhanced through a training data set which continuously learns and refines itself to improve quality of the pin marker 106 engraving. The machine learning algorithm 304 may reduce a duration of a marking operation of the pin marker 106. The machine vision algorithm 302 may improve identification of different sizes (e.g., object design parameter 308) and shapes (e.g., visual shape 306) of the object 108. The objects 108 of different shapes (e.g., visual shape 306) and sizes (e.g., object design parameter 308) on the primary belt (e.g., of the conveyor system 112) may be engraved with different corresponding associated marking patterns 210 respectively in a single sequence through an application of correspondingly different pin marking commands 212. The digital camera 104 may be embedded in the pin marker 106.

In another embodiment, a method of a marking device 102 to engrave on a target object 108 includes generating a visual signal (e.g., digital camera signal 200) of a visual state of an object 108 to be marked in real time using a digital camera 104. The method of the marking device 102 to engrave on the target object 108 includes transmitting of the visual signal (e.g., digital camera signal 200) to a master controller 100 in real time using the digital camera 104. The method of the marking device 102 to engrave on the target object 108 includes analyzing the visual state of the object 108 from the received digital camera signal 200 using the master controller 100. The method of the marking device 102 to engrave on the target object 108 includes comparing the visual state of the object 108 with a library (e.g., data library) of known visual states in a database 206 and archiving a visual shape 306 and an object design parameter 308 using the master controller 100.

In addition, the method of the marking device 102 to engrave on the target object 108 includes comparing the visual state of the object 108 with an archived shape (e.g., visual shape 306) and the object design parameter 308 of the previously marked object 108 using the master controller 100. The method of the marking device 102 to engrave on the target object 108 includes comparing the random position and the random orientation of the object 108 with the archived object design parameter 308 of the same shape (e.g., visual shape 306) and object 108 using the master controller 100. The method of the marking device 102 to engrave on the target object 108 includes extracting the associated marking pattern 210 and the desired marking location 310 of the object 108 using the master controller 100.

Further, the method of the marking device 102 to engrave on the target object 108 includes generating a marking command 212 based on the marking pattern 210, the desired marking location 310, random position and random orientation of the object 108 using processor 204 of the master controller 100. The method of the marking device 102 to engrave on the target object 108 includes transmitting the marking command 212 from the master controller 100 to a pin marker 106 of the marking device 102. The method of the marking device 102 to engrave on the target object 108 includes marking the marking pattern 210 onto the desired marking location 310 of the target object 108 in real time using the pin marker 106.

The marking pattern 210 to be marked on the object 108 may be an image, a barcode, a label, a logo, a serial number and/or a text. The material of the target object 108 may be a metal, a fiber, a wood, a glass, quartz, a ceramic, and/or steel. The marking device 102 may be a dot peen marker and/or a scriber marker. The object design parameter 308 may include shape, structure, size, length, width, depth, orientation and/or position of the object.

In yet another embodiment, a target surface marking system includes a computing device 208, a master controller 100, and a marking device 102. The computing device 208 provides a marking pattern 210 to engrave on the target surface (e.g., object 108). In one embodiment, there may be any number of computing devices (e.g., computing devices 208) that remotely access and communicate with the master controller 100. The computing device 208 transmits the marking pattern 210 to the master controller 100. The master controller 100 with a processor 204 and a memory 202 is coupled with the computing device 208. The master controller 100 analyzes a visual state of an object 108 from a digital camera signal 200 using an image recognition algorithm 300, a machine vision algorithm 302, a database 206, and a data library. The master controller 100 compares the visual state of the object 108 with a library (e.g., data library) of known visual states in the database 206 and to archive a visual shape 306 and an object design parameter 308.

In addition, the master controller 100 compares the visual state of the object 108 with an archived shape (e.g., visual shape 306) and the archived object design parameter 308 selected from a set of previously marked objects 108. The master controller 100 instantiates the machine vision algorithm 302 to identify a corresponding shape (e.g., visual shape 306) and design patterns (e.g., marking pattern 210) previously archived and stored in the data library of the database 206 of the master controller 100. The master controller 100 compares a random position and a random orientation of the object 108 with an archived object design parameter 308 of a same shape (e.g., visual shape 306) and a similar object 108.

Further, the master controller 100 receives the marking pattern 210 from the computing device 208 in real time. The master controller 100 generates a marking command 212 using the image recognition algorithm 300 and the machine vision algorithm 302 based on the position and the orientation of the object 108. The master controller 100 sends the marking command 212 to a pin marker 106.

The marking device 102 includes a digital camera 104 and the pin marker 106. The digital camera 104 of the marking device 102 generates a visual signal (e.g., digital camera signal 200) of the visual state of the object 108 to be marked in real time. The digital camera 104 of the marking device 102 transmits the generated digital camera signal 200 in real time to the master controller 100. The pin marker 106 of the marking device 102 receives the marking command 212 from the master controller 100 for marking the target surface (e.g., object 108). The pin marker 106 of the marking device 102 marks the marking pattern 210 onto the desired marking location 310 of the target object 108 in real time.

The computing device 208 may be a computer, a mobile device, a keyboard, and/or a touch-screen device to provide the marking pattern 210 in the form of an image, a barcode, a label, a logo, a serial number and/or a text. The digital camera 104 may capture a pre-engraved marking pattern from the object 108 on a conveyor system 112. The digital camera 104 may further transmit the captured pre-engraved marking pattern to the master controller 100 for marking the same pre-engraved marking pattern on the objects 108 having same visual shape 306 and an object design parameter 308.

FIG. 1 is an overview 150 of a target surface marking system to engrave a marking pattern 210 onto an object 108 using a master controller 100 and a digital camera 104 coupled marking device 102, according to one embodiment. Particularly, FIG. 1 illustrates a master controller 100, a marking device 102, a digital camera 104, a pin marker 106, an object 108, an object stream 110, a conveyor system 112, and a user 114, according to one embodiment.

The master controller 100 may be a computing system to monitor and/or manage the object 108 marking procedure. The master controller 100 may be communicatively coupled with the marking device 102. In addition, the master controller 100 may be communicatively coupled with the computing device 208 to receive the marking pattern 210 from the user 114. The master controller 100 may include an image recognition algorithm 300, a machine vision algorithm 302, a machine learning algorithm 304, a memory 202, a processor 204, and a database 206, according to one embodiment.

The master controller 100 may receive the digital camera signal 200 in real time from the digital camera 104 of the marking device 102. The master controller 100 may analyze the visual state of the object 108 from the received digital camera signal 200. The master controller 100 may compare the visual state of the object 108 with a library (e.g., data library) of known visual states in a database 206, archiving a visual shape 306 and an object design parameter 308 of the object 108. The master controller 100 may compare the visual state of the object 108 with an archived shape (e.g., visual shape 306) and the object design parameter 308 of the previously marked object 108. The master controller 100 may identify the corresponding shape (e.g., visual shape 306) and design patterns (e.g., marking pattern 210) from the set of previously archived and stored in the data library of the database 206, according to one embodiment.

The master controller 100 may compare the random position and the random orientation of the object 108 with the archived object design parameter 308 of the same shape (e.g., visual shape 306) and similar object 108. The master controller 100 may extract the associated marking pattern 210 and the desired marking location 310 of the object 108. The master controller 100 may generate a marking command 212 to mark the marking pattern 210 on the target object 108 based on the marking pattern 210, the desired marking location 310, random position and orientation of the object 108 using the processor 204. The master controller 100 may transmit the marking command 212 to the pin marker 106 of the marking device 102 to engrave the marking pattern 210 onto the object surface 108. In addition, the master controller 100 may only allow marking of a compliant object 108 on the conveyor system 112. The master controller 100 may identify a non-compliant object 108 on the conveyor system 112. The master controller 100 may communicate the non-compliant signal to the conveyor system 112 to send the non-compliant object 108 to a bypass belt, according to one embodiment.

In another embodiment, the master controller 100 may receive the marking pattern 210 from the user 114 through the computing device 208. The master controller 100 may archive the received marking pattern 210 along with the visual shape 306 and the object design parameter 308. The master controller 100 may generate the marking command 212 based on the provided marking pattern 210, the desired marking location 310, random position and random orientation of the object 108 using the processor 204, according to one embodiment.

The marking device 102 may be a machine structure to engrave the marking pattern 210 onto the object 108 based on the received marking command 212. The marking device 102 may engrave the marking pattern 210 such as barcode, labels, logo, serial number, and/or text etc., on the desired marking location 310 of object 108. The marking device 102 may be a hand held and/or a fixed mount marking device 102, according to one embodiment.

The marking device 102 may include the digital camera 104 and the pin marker 106. The marking device 102 may be communicatively coupled with the digital camera 104 to transmit the real time visual data (e.g., digital camera signal 200) of the object 108 to the master controller 100. The marking device 102 may receive the marking command 212 from the master controller 100 to engrave the marking pattern 210 on the desired marking location 310 of the object 108 using the pin marker 106. The marking device 102 and the master controller 100 may be coupled through a wired and/or a wireless network, according to one embodiment.

The digital camera 104 may be an electronic device to record visual images and/or video (e.g., digital camera signal 200) of the object 108 and communicate it to the master controller 100 for analysis of the visual state of the object 108. The digital camera 104 may continuously generate a visual signal (e.g., digital camera signal 200) of the visual state of the object 108 on the conveyor system 112 in real time. The digital camera 104 may be communicatively coupled to the marking device 102. The digital camera 104 may communicate the real time visual state of the object 108 to the master controller 100. The digital camera 104 may capture the marking operation and communicate the real time digital camera signal 200 to the computing device 208 to allow user 114 for monitoring the marking operation in real time, according to one embodiment.

The digital camera 104 may be embedded inside and/or attached outside the marking device 102 such that the digital camera 104 is a part of the marking device 102. The coverage of the digital camera 104 may allow the user 114 to monitor the complete object 108 in real time on the display screen of the computing device 208 communicatively coupled with the master controller 100. Further, the digital camera 104 may capture the real time position and/or orientation of the object 108. The digital camera 104 of the marking device 102 may be a portable camera to allow the user 114 to focus on the object 108 to monitor the target object 108 according to the desired view, according to one embodiment.

In another embodiment, the digital camera 104 may capture a pre-engraved marking pattern from the object 108 on the primary belt of the conveyor system 112 in real time while the object 108 is being marked. The digital camera 104 may further transmit the captured pre-engraved marking pattern to the master controller 100 for marking the captured pre-engraved marking pattern on the objects 108 having same visual shape 306 and same object design parameter 308, according to one embodiment.

The pin marker 106 may be a hard metal with a sharp point at one end like a needle to optimally inscribe the marking pattern 210 onto the object 108 based on the received marking command 212. The pin marker 106 may receive the marking command 212 from the master controller 100. The pin marker 106 of the marking device 102 may engrave the marking pattern 210 on the desired marking location 310 of the object 108 based on the received marking command 212, according to one embodiment.

The pin marker 106 may be a dot peen marker and/or a scriber marker. The pin marker 106 may have an array of pins in a dot matrix format. The pin marker 106 may be operated in the x-y plane to engrave onto the target object 108 based on the marking command 212 communicated by the master controller 100. The pin marker 106 may be operated by the air and/or electricity to engrave the marking pattern 210 on the object 108. The pin marker 106 of the marking device 102 may be a single pin and/or a multi-pin marker. In another embodiment, the pin marker 106 may be a laser marker to use laser engraving technique for inscribing the marking pattern 210 onto the object 108, according to one embodiment.

The object 108 may be an article and/or a product that needs to be engraved with particular marking pattern 210 using the marking device 102 for its identification and/or tractability. The object 108 may be carried on the conveyor system 112 performing various operations involved in manufacturing process. The objects 108 of different shapes (e.g., visual shape 306) and sizes (e.g., object design parameter 308) on the primary belt (e.g., of conveyor system 112) may be engraved with different corresponding associated marking patterns 210 respectively in a single sequence through an application of correspondingly different marking commands 212, according to one embodiment.

The material of the object 108 may be a metal, a fiber, a wood, a glass, quartz, a ceramic, and/or steel, etc. The object 108 may be engraved with the marking pattern 210 such as text, barcode, labels, design, logo, serial number, data library, and/or QR code etc., using the marking device 102 and the master controller 100. Each object 108 may have a different shape (e.g., visual shape 306), object design parameter 308, position and/or orientation, according to one embodiment.

The object stream 110 may be a series of in-queue (e.g., waiting to engrave) objects 108 that needs to be engraved using the marking device 102 for identification and/or tractability of the object 108. The different objects (e.g., object 108 and/or object stream 110) of the object stream 110 may have a different visual shape 306 and/or the object design parameter 308. The conveyor system 112 may be mechanical handling equipment to move the objects (e.g., object 108 and/or object stream 110) from one location to another performing various operations involved in manufacturing process. The conveyor system 112 may receive the complaint signal from the master controller 100 to allow marking of a compliant object 108. Further, the conveyor system 112 may receive the non-compliant signal from the master controller 100 to send the non-compliant object 108 to a bypass belt, according to one embodiment.

The user 114 may be a computing device 208 operator to monitor the target surface marking system and/or procedure in real time. The user 114 may provide the marking pattern 210 and desired marking location 310 through the computing device 208 to engrave it onto the object 108. The user 114 may monitor the object 108 to rearrange and/or redesign the mark (e.g., marking pattern 210) in real time on the display screen of the computing device 208 to engrave the marking pattern 210 onto the desired marking location 310 of the object 108, according to one embodiment.

Figure 2A:
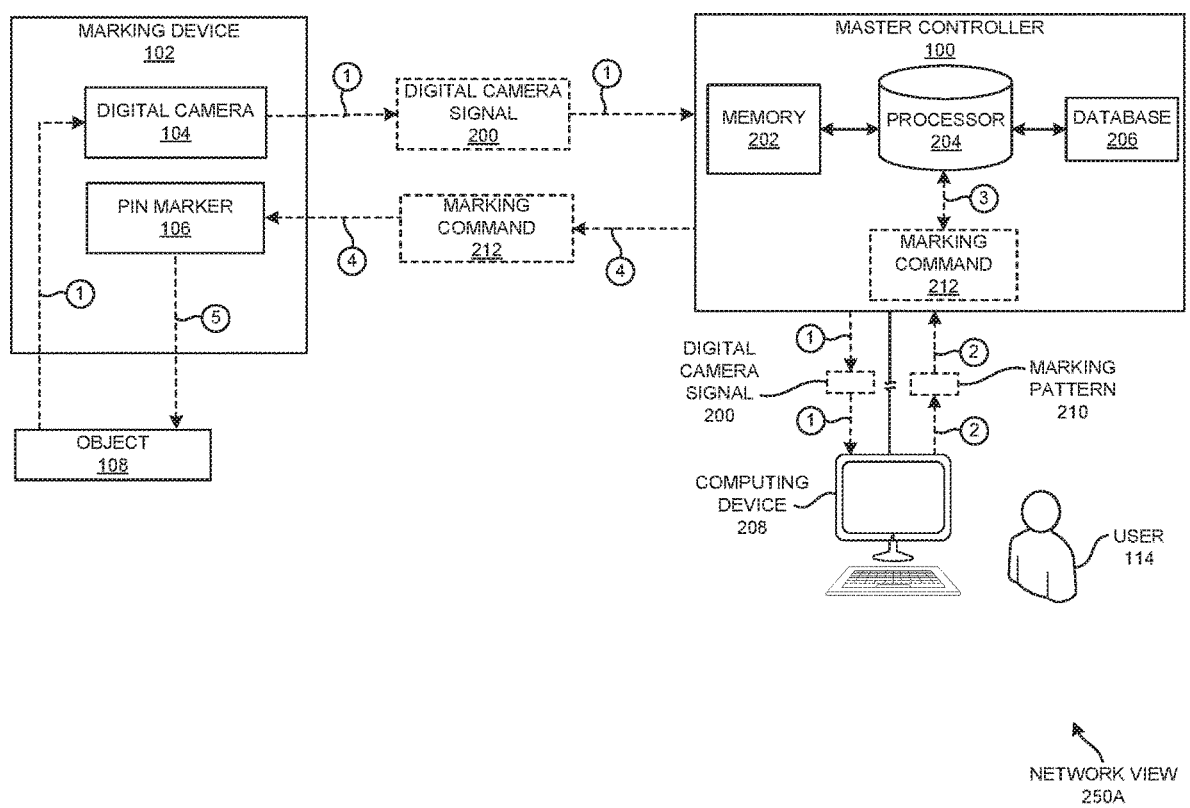
FIG. 2A is a network view of the master controller of FIG. 1 receiving a real time visual state of the object and communicating a marking command to mark onto the object using a pin marker based on the marking pattern provided by a user, according to one embodiment.

FIG. 2A is a network view 250A of the master controller 100 of FIG. 1 receiving a real time visual state (e.g., digital camera signal 200) of the object 108 and communicating a marking command 212 to mark onto the object 108 using a pin marker 106 based on the marking pattern 210 provided by a user 114, according to one embodiment. Particularly, FIG. 2A illustrates a digital camera signal 200, a memory 202, a processor 204, a database 206, a computing device 208, a marking pattern 210, and a marking command 212, according to one embodiment.

The digital camera signal 200 may be a real time visual information (e.g., image and/or video) of the object 108 captured by the digital camera 104 of the marking device 102 to transmit it to the master controller 100 of the target surface marking system. The digital camera signal 200 may be transmitted to the master controller 100 from the digital camera 104 in real time. The digital camera signal 200 may be analyzed by the image recognition algorithm 300 to determine the object design parameter 308 of the object 108. The digital camera signal 200 may be analyzed to display the object characteristics (e.g., marking pattern 210, visual shape 306, object design parameter 308 and desired marking location 310) in real time on the display screen of the computing device 208 communicatively coupled with the master controller 100, according to one embodiment.

The memory 202 may be a computer hardware device used to store information for immediate use of the master controller 100. The processor 204 may be a logic circuitry that responds to and processes the basic instructions to drive the master controller 100. The processor 204 of the master controller 100 may generate the marking command 212 using the machine vision algorithm 302 based on the marking pattern 210, the desired marking location 310, random position and orientation of the object 108. The processor 204 may be coupled to database 206 to extract the object characteristics (e.g., marking pattern 210, desired marking location 310) when required, according to one embodiment.

The database 206 may be an organized collection of data to be used by the master controller 100 of the target surface marking system. The database 206 may identify an organization of records in which various visual states of various object (e.g., object 108) as well as various design parameters (e.g., object design parameter 308) are stored in different tables. The tables may be referred to as data libraries. The database 206 may include collection of the visual shape 306, the object design parameter 308, the marking pattern 210 and the desired marking location 310 of the objects 108. The database 206 of the master controller 100 may archive the object characteristics (e.g., marking pattern 210, visual shape 306, object design parameter 308 and desired marking location 310) from the analyzed digital camera signal 200 in the data library. The database 206 may be coupled to the memory 202 and processor 204 to allow the extraction of object characteristics (e.g., marking pattern 210, visual shape 306, object design parameter 308 and desired marking location 310) when required, according to one embodiment.

The computing device 208 may be an input device to communicate the marking pattern 210 to engrave it onto the object 108. The computing device 208 may allow the user 114 to monitor the object 108 in real time. In addition, the computing device 208 may allow the user 114 to rearrange and/or redesign the marking pattern 210 in real time on the display screen of the computing device 208 to engrave the mark (e.g., marking pattern 210) on the desired marking location 310 of the object 108. The computing device 208 may be a computer, a mobile device, a keyboard, and/or a touch-screen device etc. The computing device 208 may be a handheld device and/or a fixed mount device, according to one embodiment.

The marking pattern 210 may be a visible impression stamped on the object 108 to indicate the information about its identification, traceability, origin and/or ownership. The marking pattern 210 may be provided by the user 114 to the master controller 100 through the computing device 208. The marking pattern 210 may be archived in the database 206 of the master controller 100. The marking pattern 210 for the previously marked objects 108 may be extracted from the database 206 of the master controller 100. The marking pattern 210 that to be marked on the desired marking location 310 of the object 108 may be an image, a barcode, a label, a logo, a serial number and/or a text, according to one embodiment.

The marking command 212 may be an instruction generated by the master controller 100 to engrave a particular marking pattern 210 on the desired marking location 310 of the object 108. The marking command 212 may be generated by the processor 204 using the image recognition algorithm 300 and the machine vision algorithm 302. The marking command 212 may be generated based on the marking pattern 210, the desired marking location 310, random position and orientation of the object 108. The marking command 212 may be communicated from the master controller 100 to the pin marker 106 of the marking device 102 to engrave a particular marking pattern 210 on the desired marking location 310 of the object 108, according to one embodiment.

FIG. 2A illustrates the number of operations between the object 108, the marking device 102, the master controller 100 and the computing device 208. Particularly, circle '1' of FIG. 2A illustrates the visual state (e.g., digital camera signal 200) of the object 108 being captured and communicated in real time from the digital camera 104 of the marking device 102 to the master controller 100. The circle '1' further illustrates the digital camera signal 200 being communicated to the computing device 208 coupled with the master controller 100 enabling the user 114 to monitor the object 108 in real time on the display screen of the computing device 208, according to one embodiment.

The circle '2' shows the marking pattern 210 being communicated to the master controller 100 by the user 114 through the computing device 208. The circle '3' shows the generation of the marking command 212 by the processor 204 using the machine vision algorithm 302 based on the input provided by the user 114. The circle '4' illustrates the marking command 212 being communicated from the master controller 100 to the pin marker 106 of the marking device 102. The circle '5' illustrates the marking pattern 210 engraving operation of the pin marker 106 of the marking device 102 on the desired marking location 310 of the object 108 based on the received marking command 212, according to one embodiment.

Figure 2B:
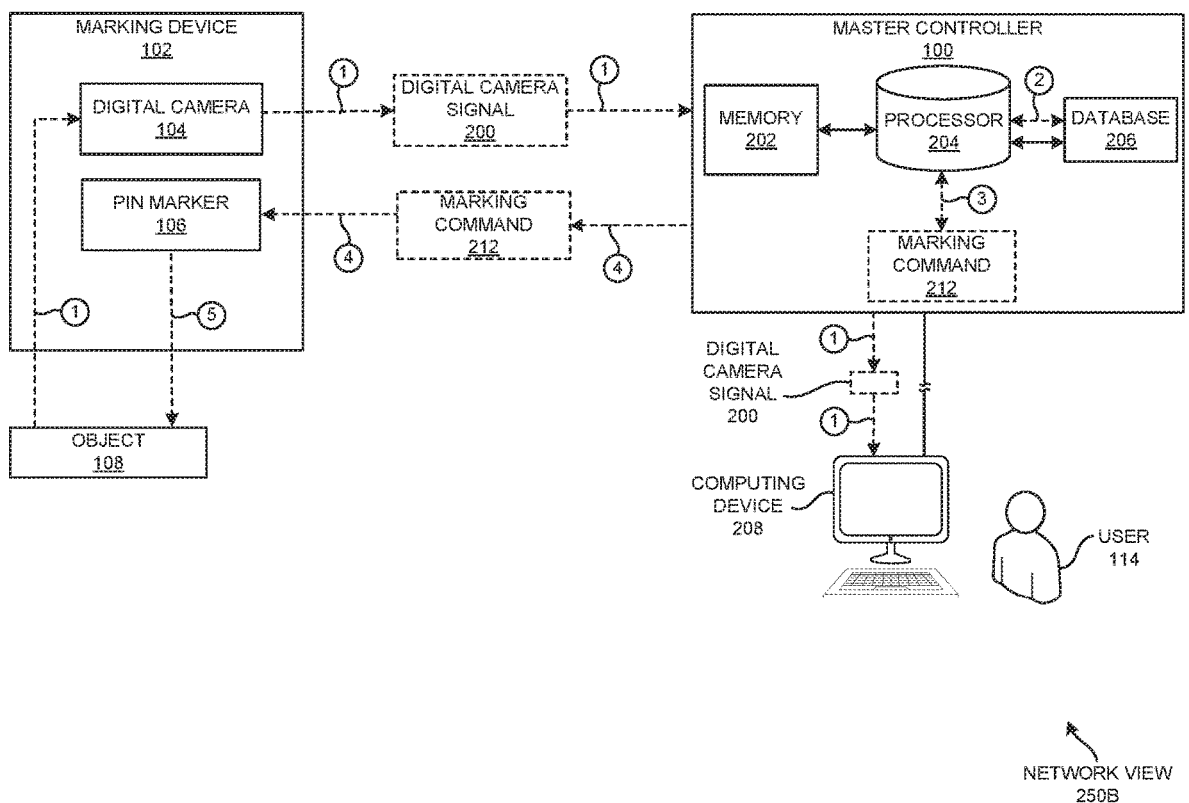
FIG. 2B is another network view of the master controller of the target surface marking system of FIG. 1 receiving the real time visual state of the object and communicating the extracted marking command to the pin marker for the object having same shape, according to one embodiment.

FIG. 2B is another network view 250B of the master controller 100 of the target surface marking system of FIG. 1 receiving the real time visual state (e.g., digital camera signal 200) of the object 108 and communicating the extracted marking command 212 to the pin marker 106 for the object 108 having same shape (e.g., visual shape 306), according to one embodiment.

FIG. 2B illustrates the number of operations between the object 108, the marking device 102, the master controller 100 and the computing device 208. Particularly, circle '1' of FIG. 2B illustrates the visual state (e.g., digital camera signal 200) of the object 108 being captured and communicated in real time from the digital camera 104 of the marking device 102 to the master controller 100. The circle '1' further illustrates the digital camera signal 200 being communicated to the computing device 208 coupled with the master controller 100 enabling the user 114 to monitor the object 108 in real time on the display screen of the computing device 208, according to one embodiment.

The circle '2' shows the comparison operation of the analyzed digital camera signal 200 with the previously archived object characteristics (e.g., visual shape 306 and object design parameter 308) in the database 206 using the image recognition algorithm 300 and the processor 204. The circle '2' further shows extraction of the marking pattern 210 and desired marking location 310 from the database 206 to the processor 204 for the object 108 having same shape (e.g., visual shape 306) and same object design parameter 308, according to one embodiment.

The circle '3' shows the generation of the marking command 212 by the processor 204 using machine vision algorithm 302 based on extracted marking pattern 210 and corresponding desired marking location 310. The circle '4' illustrates the marking command 212 being communicated from the master controller 100 to the pin marker 106 of the marking device 102. The circle '5' illustrates the marking pattern 210 engraving operation of the pin marker 106 of the marking device 102 on the object 108 based on the received marking command 212, according to one embodiment.

Figure 3:
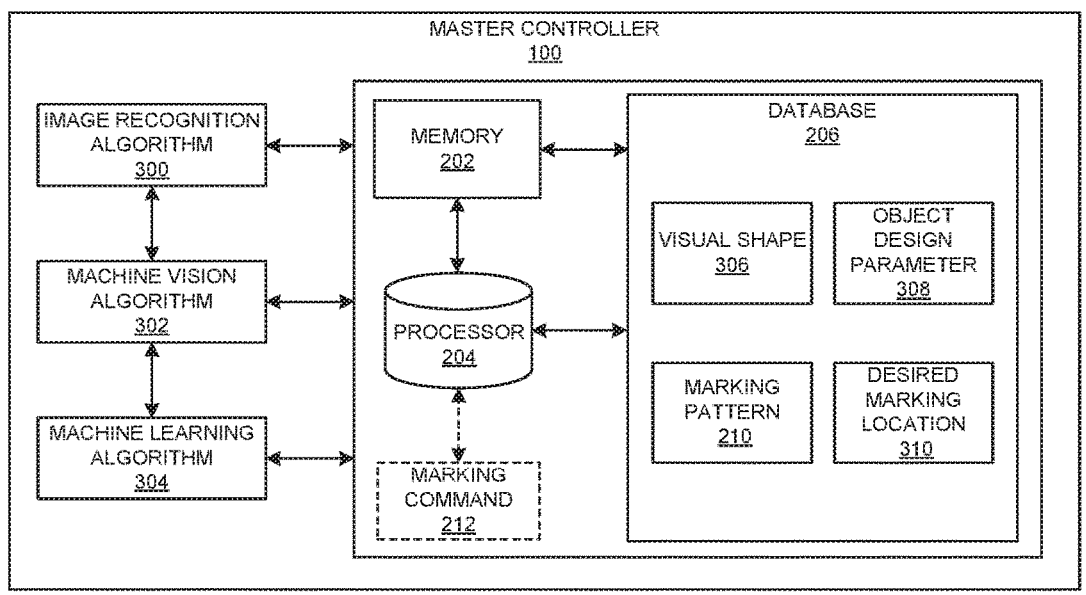
FIG. 3 is an exploded view of the master controller of FIG. 1, according to one embodiment.

FIG. 3 is an exploded view 350 of the master controller 100 of FIG. 1, according to one embodiment. Particularly, FIG. 3 illustrates an image recognition algorithm 300, a machine vision algorithm 302, a machine learning algorithm 304, a visual shape 306, an object design parameter 308, and a desired marking location 310, according to one embodiment.

The image recognition algorithm 300 may be a coded program to analyze the digital camera signals 200 in real time received from the digital camera 104 of the marking device 102. The image recognition algorithm 300 may be coupled with the processor 204, the memory 202 and the database 206 to analyze the digital camera signals 200 in real time. The image recognition algorithm 300 may determine the visual shape 306 and the object design parameter 308 of the object 108 based on the analyzed digital camera signal 200. The image recognition algorithm 300 may archive the visual shape 306, the object design parameter 308, the corresponding marking pattern 210 and the desired marking location 310 of the analyzed object 108 in the database 206, according to one embodiment.

The image recognition algorithm 300 may identify the non-compliant object 108 and the previously engraved object 108 on the conveyor system 112. The image recognition algorithm 300 may recognize the visual shape 306 and the object design parameter 308 of the previously marked object 108 and extract the associated marking pattern 210 and desired marking location 310 of the object 108 from the database 206. The image recognition algorithm 300 may compare the random position and random orientation of the object 108 with the archived object characteristics (e.g., in the database 206) having same visual shape 306 and object design parameter 308, according to one embodiment.

In another embodiment, the image recognition algorithm 300 may analyze the captured pre-engraved marking pattern communicated by the digital camera 104 of the marking device 102. The image recognition algorithm 300 may evaluate the contours of the captured pre-engraved marking pattern to generate the marking command 212 (e.g., using machine vision algorithm 302) to mark the captured pre-engraved marking pattern on the desired marking location 310 of the object 108. In addition, the image recognition algorithm 300 may archive the captured pre-engraved marking pattern in the database 206, according to one embodiment.

The machine vision algorithm 302 may be a coded program to generate and/or modify the marking command 212 in real time based on the marking pattern 210 provided by the user 114 (e.g., through the computing device 208). The machine vision algorithm 302 may be coupled with the processor 204, the memory 202 and the database 206 to generate the marking command 212. The machine vision algorithm 302 may communicate the marking command 212 to the pin marker 106 of the marking device 102 to optimally engrave the marking pattern 210 on the desired marking location 310 of the object 108. The machine vision algorithm 302 may generate the marking command 212 based on the random position and random orientation of the object 108 analyzed by the image recognition algorithm 300, according to one embodiment.

The machine learning algorithm 304 may apply a neural network enhanced through a training data set to learn continuously and refine itself to improve quality of a pin marker 106 engraving. The machine learning algorithm 304 may help to reduce duration of a marking operation of the pin marker 106. The visual shape 306 may be an external form of the object 108 that to be marked using the master controller 100 and the marking device 102. The visual shape 306 of the object 108 may be analyzed by the image recognition algorithm 300 of the master controller 100. The visual shape 306 of the object 108 may be archived in the database 206 of the master controller 100, according to one embodiment.

The object design parameter 308 may be the measuring factor of the object 108 analyzed by the image recognition algorithm 300 to compare it with other objects 108 in the object stream 110. The object design parameter 308 may include the length, the width, the height, the position and the orientation of the object 108. The object design parameter 308 may be archived in the database 206 of the master controller 100. The object design parameter 308 of the newly analyzed object 108 may be compared with the archived object design parameter 308 to extract the marking pattern 210 and the desired marking location 310 from the database 206, according to one embodiment.

The desired marking location 310 may be a preferred area for engraving the marking pattern 210 onto the object surface 108. The desired marking location 310 may be provided by the user 114 to the master controller 100 through the computing device 208. The desired marking location 310 may be archived in the database 206 of the master controller 100. The desired marking location 310 may be extracted for the previously marked object 108 from the database 206 to mark the object 108 having same shape (e.g., visual shape 306), according to one embodiment.

Figure 4:
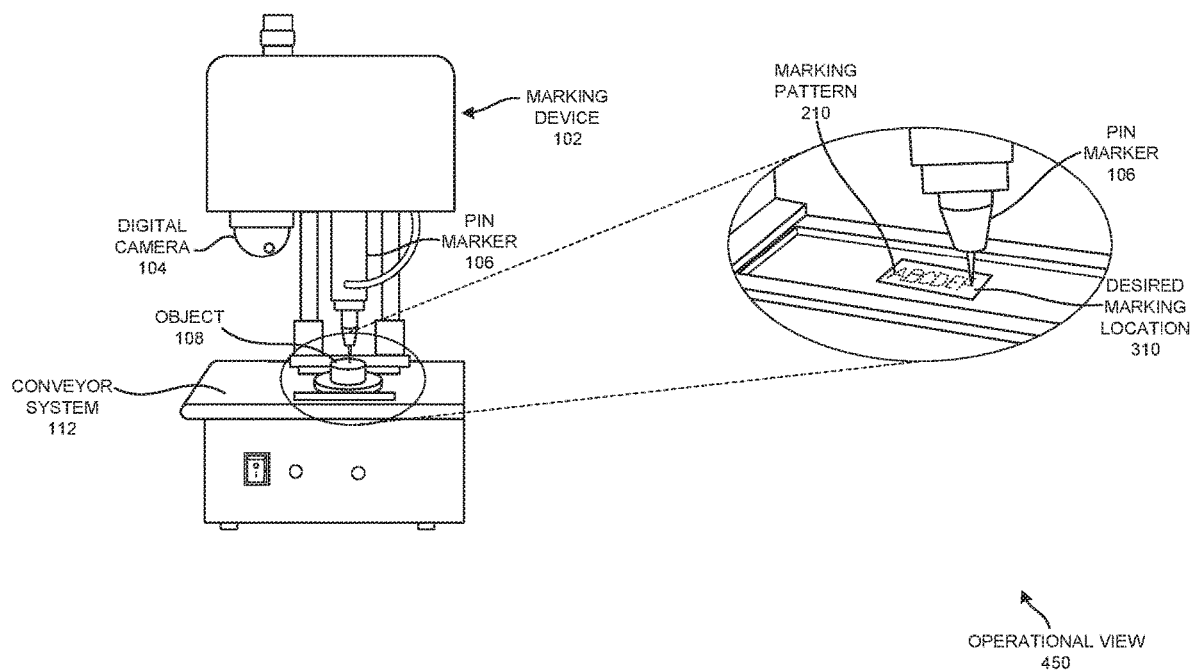
FIG. 4 is an operational view of the marking device of FIG. 1 to engrave the marking pattern onto a desired marking location of the object using the pin marker, according to one embodiment.

FIG. 4 is an operational view 450 of the marking device 102 of FIG. 1 to engrave the marking pattern 210 onto a desired marking location 310 of the object 108 using the pin marker 106, according to one embodiment. FIG. 4 illustrates the function of the pin marker 106 of the marking device 102 to mark on the object 108 at its desired marking location 310. The pin marker 106 may mark the object 108 at its desired marking location 310 based on the received marking command 212. The digital camera 104 may capture the marking operation and communicate the real time digital camera signal 200 to the computing device 208 to allow the user 114 to monitor the marking operation in real time, according to one embodiment.

FIG. 5 is a table view 550 illustrating the archived characteristics of the objects 108 in a database 206 of the master controller 100 of FIG. 1, according to one embodiment. The database 206 may archive the visual shape 306, the object design parameter 308, the marking pattern 210, and the desired marking location 310 of the analyzed objects 108. Different objects (e.g., object 108 and object stream 110) may have different object characteristics (e.g., visual shape 306, object design parameter 308, marking pattern 210, and desired marking location 310). The characteristics of the objects 108 may be stored in the data library of the database 206. It should be understood that the data library may be one or more "tables" in the database 206 having set of data elements (values) using a model of vertical columns (identifiable by name) and horizontal rows, the cell being the unit where a row and column intersect. A data library may have a specified number of columns, and may have any number of rows. The image recognition algorithm 300 may analyze the captured digital camera signal 200 communicated by the digital camera 104 and extract the marking command 212 from the data library of the database 206 for the object 108 having same shape (e.g., visual shape 306) and same object design parameter 308, according to one embodiment.

Figure 6A:
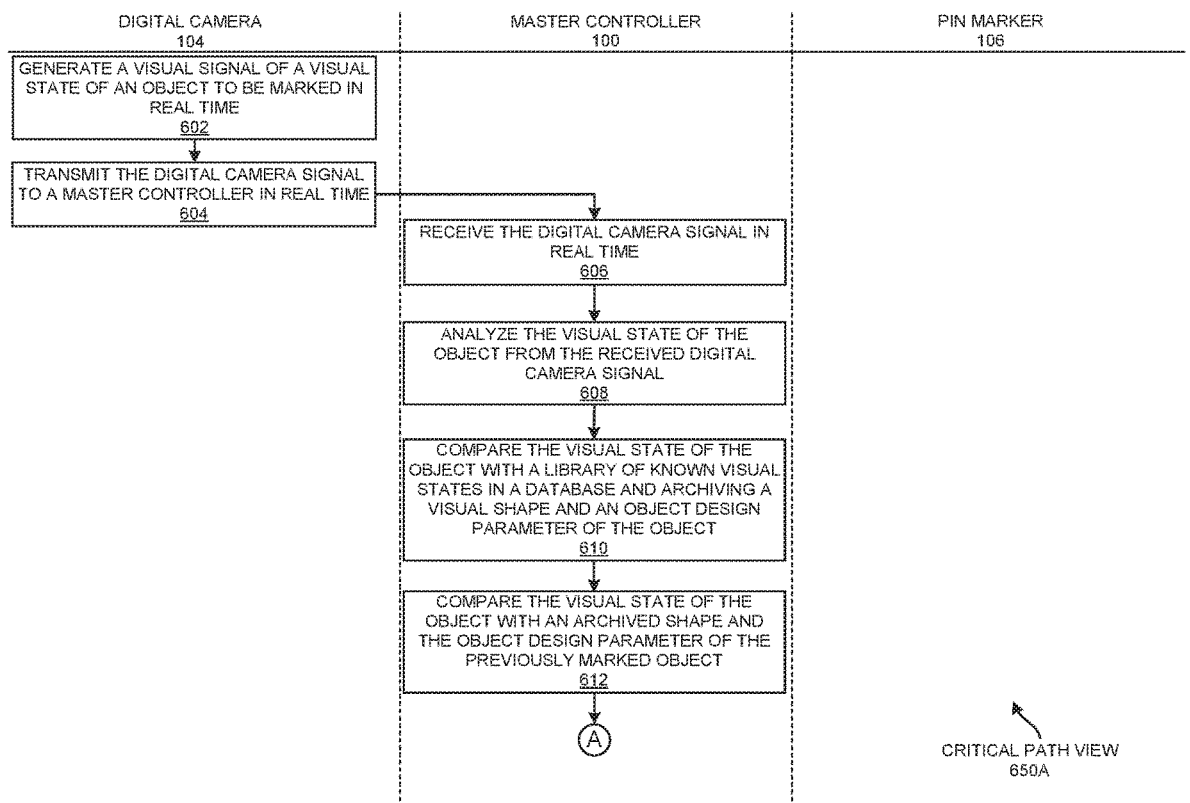
FIG. 6A is a critical path view illustrating a flow based on time where a digital camera of the marking device generates a visual signal of a visual state of the object to engrave the marking pattern onto the object in real time using the master controller of FIG. 1, according to one embodiment.
Figure 6B:
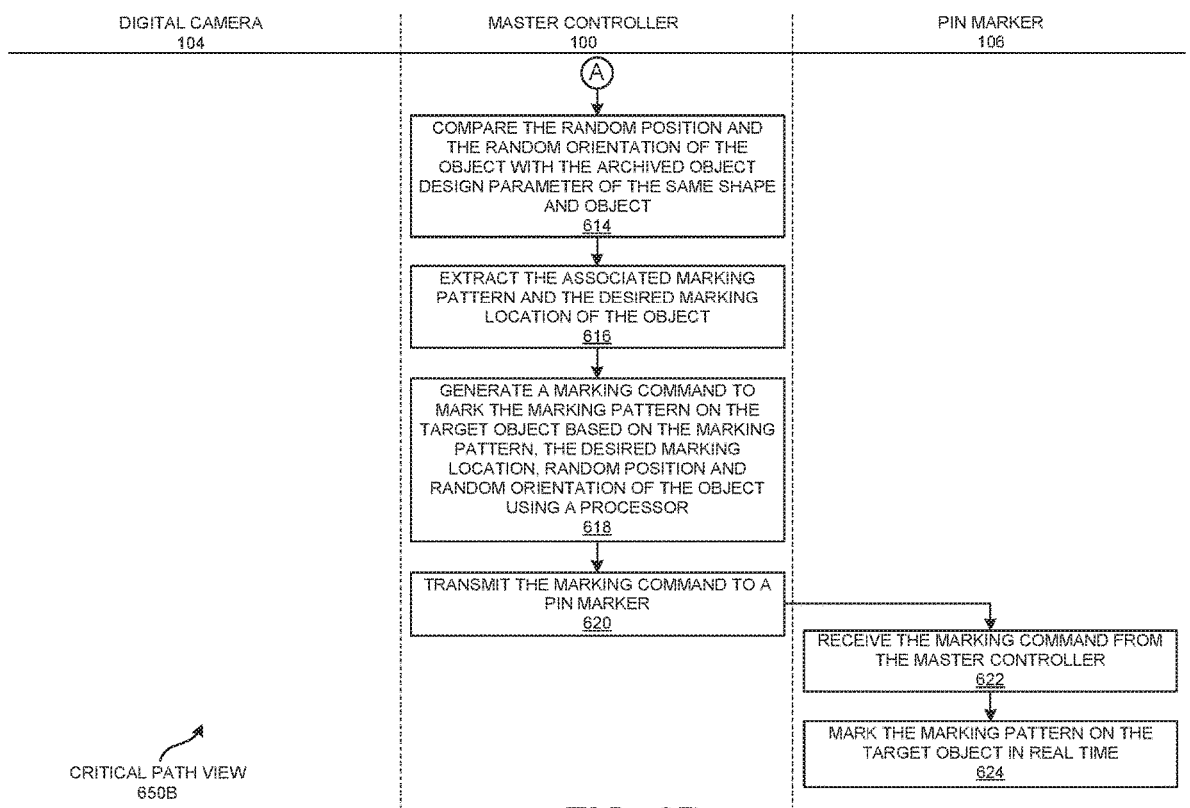
FIG. 6B is continuation of the critical path view of FIG. 6A illustrating a flow based on time where a digital camera of the marking device generates a visual signal of a visual state of the object to engrave the marking pattern onto the object in real time using the master controller of FIG. 1, according to one embodiment.

FIG. 6A is a critical path view 650A illustrating a flow based on time where a digital camera 104 of the marking device 102 generates a visual signal (e.g., digital camera signal 200) of a visual state of the object 108 to engrave the marking pattern 210 onto the object 108 in real time using the master controller 100 of FIG. 1, according to one embodiment. In step 602, the digital camera 104 of the marking device 102 may generate the visual signal (e.g., digital camera signal 200) of the visual state of an object 108 to be marked in real time. In step 604, the digital camera 104 may transmit the digital camera signal 200 to the master controller 100 in real time, according to one embodiment.

In step 606, the master controller 100 may receive the digital camera signal 200 in real time. In step 608, the master controller 100 may analyze the visual state of the object 108 from the received digital camera signal 200. In step 610, the master controller 100 may compare the visual state of the object 108 with a library (e.g., data library) of known visual states in a database 206 and archiving a visual shape 306 and an object design parameter 308, according to one embodiment.

In step 612, the master controller 100 may compare the visual state of the object 108 with an archived shape (e.g., visual shape 306) and the object design parameter 308 of the previously marked object 108.

FIB. 6B is continuation of the critical path view 650B of FIG. 6A. In step 614, the master controller 100 may compare the random position and the random orientation of the object 108 with the archived object design parameter 308 of the same shape (e.g., visual shape 306) and similar object 108. In step 616, the master controller 100 may extract the associated marking pattern 210 and the desired marking location 310 of the object 108, according to one embodiment.

In step 618, the master controller 100 may generate a marking command 212 to mark the marking pattern 210 on the target object 108 based on the marking pattern 210, the desired marking location 310, random position and orientation of the object 108 using a processor 204. In step 620, the master controller 100 may transmit the marking command 212 to the pin marker 106. In step 622, the pin marker 106 may receive the marking command 212 from the master controller 100. In step 624, the pin marker 106 may mark the marking pattern 210 on the target object 108 in real time, according to one embodiment.

Figure 7:
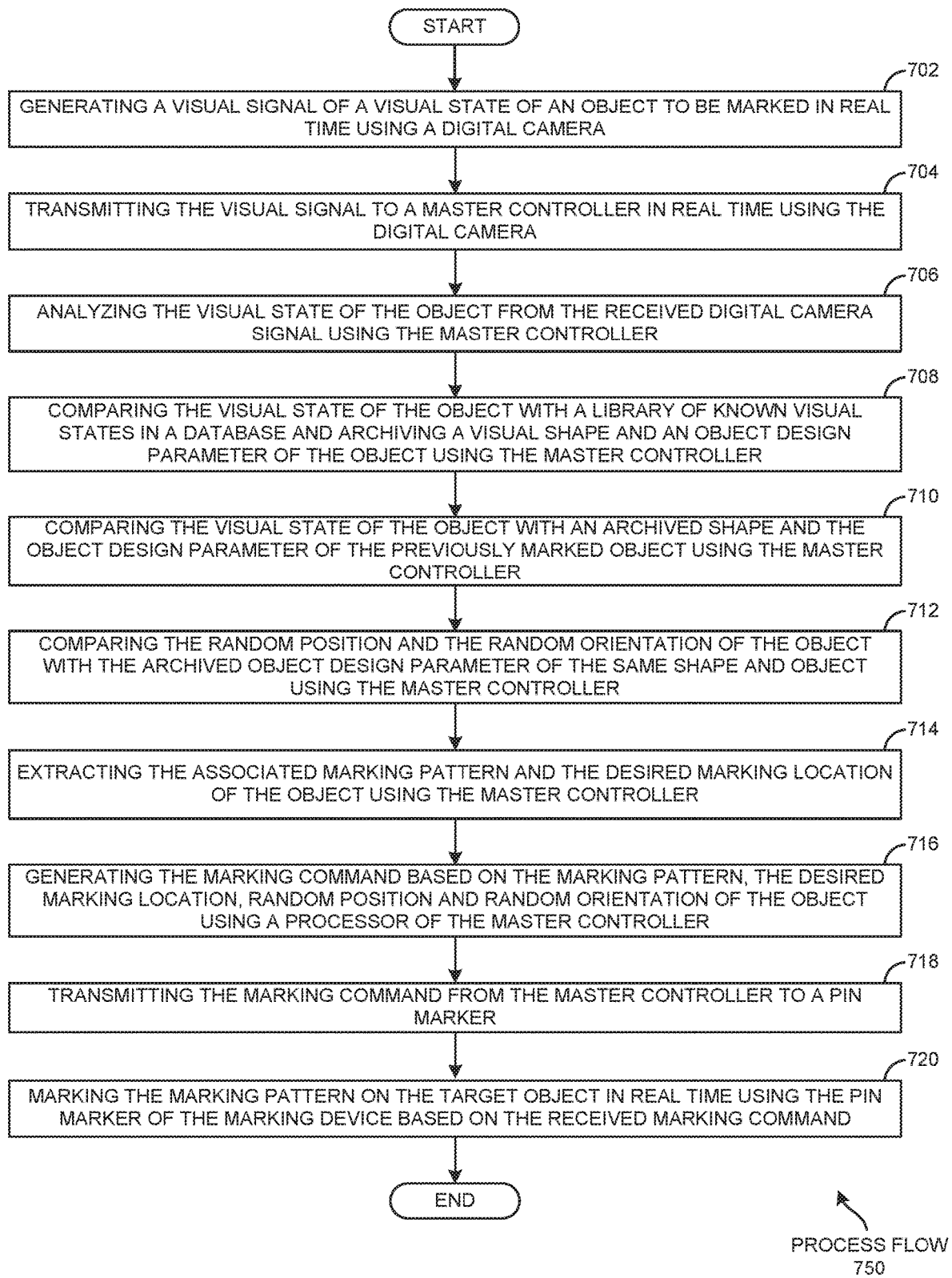
FIG. 7 is a process flow detailing the operations involved in engraving the marking pattern onto the object in real time using the digital camera coupled marking device of FIG. 1, according to one embodiment.

FIG. 7 is a process flow 750 detailing the operations involved in engraving the marking pattern 210 onto the object 108 in real time using the digital camera 104 coupled marking device 102 of FIG. 1, according to one embodiment. In operation 702, the digital camera 104 may generate a visual signal (e.g., digital camera signal 200) of a visual state (e.g., a position, a shape, or an orientation of the object in reference to the pin marker 106) of an object 108 (e.g., a position, a shape, or an orientation of the object) to be marked in real time. In operation 704, the digital camera 104 may transmit the visual signal (e.g., digital camera signal 200) to a master controller 100 in real time. In operation 706, the master controller 100 may analyze the visual state of the object 108 from the received digital camera signal 200, according to one embodiment.

In operation 708, the master controller 100 may compare the visual state of the object 108 with a library (e.g., data library) of known visual states in a database 206 and archiving a visual shape 306 and an object design parameter 308. In operation 710, the master controller 100 may compare the visual state of the object 108 with an archived shape (e.g., visual shape 306) and the object design parameter 308 of the previously marked object 108. In operation 712, the master controller 100 may compare the random position and the random orientation of the object 108 with the archived object design parameter 308 of the same shape (e.g., visual shape 306) and object 108, according to one embodiment.

In operation 714, the master controller 100 may extract the associated marking pattern 210 and the desired marking location 310 of the object 108. In operation 716, the master controller 100 may generate a marking command 212 based on the marking pattern 210, the desired marking location 310, random position and random orientation of the object 108 using a processor 204. In operation 718, the master controller 100 may transmit the marking command 212 to a pin marker 106. In operation 720, the pin marker 106 of the marking device 102 may mark the marking pattern 210 on the target object 108 in real time, according to one embodiment.

An example embodiment will now be described. John Doe may be running an ACME Tools Factory for producing automobile spare parts. John may be supplying these automobile spare parts manufactured at his ACME Tools Factory to renowned automobile companies. The ACME Tools Factory may be producing different parts of clutches and pistons for cars and motorbikes. The clutches manufactured by ACME Tools Factory may include flywheel, friction plate, pressure plate, releasing spring, and cover of wheel etc.

The ACME Tools Factory may have multiple small units to manufacture these parts. Each of the products coming out of its manufacturing units may have to be marked with the company's logo and product information using a marking system. The marking system at the ACME Tools Factory may require its units to place its products at a particular position to get marking at the desired marking surface and/or area. An inappropriate positioning of the product in the marking system may result in erroneous placement of the mark on its products. Further, marking system at the ACME Tools Factory may require a separate marking instruction for each of its specific components. For this reason, ACME Tools Factory's manufacturing units may have difficulty in marking different spare parts in a single assembly line, making it costly.

John's ACME Tools Factory may have installed the new digital camera 104 coupled marking device 102 of the target surface marking system as discussed in various embodiments of FIGS. 1-7. The new digital camera 104 coupled marking device 102 of FIGS. 1-7 may enable various components (e.g., object 108 and object stream 110) of clutches and pistons of different shapes (e.g., visual shape 306) and sizes (e.g., object design parameter 308) manufactured in the ACME Tools Factory to be engraved with corresponding associated marking patterns 210 respectively in a single sequence.

The master controller 100 of the target surface marking system of FIGS. 1-7 may analyze the visual state of various components (e.g., object 108 and object stream 110) on the conveyor belt (e.g., conveyor system 112) of the ACME Tools Factory using the digital camera signal 200. The master controller 100 of the target surface marking system of FIGS. 1-7 may compare the visual state of various components (e.g., object 108 and object stream 110) with a library of known visual states in the database 206 of the ACME Tools Factory. The master controller 100 may compare the random position and random orientation of various components (e.g., object 108 and object stream 110) with an archived parameter (e.g., object design parameter 308) of a same shape (e.g., visual shape 306) and a same orientation of a similar object 108.

The master controller 100 may extract the associated marking pattern (e.g., marking pattern 210) and the desired marking location 310 of the component (e.g., object 108) to mark the correct marking pattern 210 of the ACME Tools Factory on the clutch and/or piston component. The ACME Tools Factory may now be able to correctly mark a desired surface (e.g., desired marking location 310) of each of its component (e.g., object 108) in a single conveyor belt (e.g., conveyor system 112), saving cost. The use of new target surface marking system as described in various embodiments of FIGS. 1-7 may now have helped the ACME Tools Factory save its revenue, and thus enhancing overall profit of ACME Tools Factory.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., data processing device. Accordingly, the specification and drawings are to be regarded in an illustrative rather than a restrictive sense.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The invention claimed is:

1. A target surface marking system, comprising:
a master controller with a processor and a memory:
to analyze a visual state of an object from a digital camera signal using an image recognition algorithm, a machine vision algorithm, a database, and a data library,
to compare the visual state of the object with a library of known visual states in the database and to archive a visual shape and a design parameter of the object,
to compare the visual state and the design parameter of the object with an archived shape and an archived design parameter selected from a set of previously marked objects,
to instantiate the machine vision algorithm to identify a corresponding shape and design patterns previously archived and stored in the data library of the database of the master controller,
to compare a random position and a random orientation of the object with an archived parameter of a same shape and a same orientation of a similar object,
to extract an associated marking pattern and a desired marking location of the object to ensure that the object on a conveyor system corresponds to a selected marking, and
to send a marking command to a pin marker,
a digital camera communicatively connected to the master controller:
to generate a visual signal of the visual state of the object to be marked in real time; and
to transmit the generated digital camera signal to the master controller in real time; and
the pin marker:
to receive the marking command from the master controller; and
to mark the marking pattern onto the desired marking location of the target surface in real time.

2. The target surface marking system of claim 1, wherein the pin marker has an array of pins in a dot matrix format.

3. The target surface marking system of claim 1, wherein the pin marker is a laser marker.

4. The target surface marking system of claim 1, further comprising a second camera, wherein the digital camera to send a visual image of the marking target while the second camera to check a quality of an engraving and to send the digital signal to the master controller in real time.

5. The target surface marking system of claim 1,
wherein when only a specific marking is desired through the marking command, only allowing marking of a compliant object, and permitting the compliant object to move in a forward path, along a primary belt, and
if the object on the primary belt is non-compliant, meaning the object does not correspond to the marking command, to send a non-compliant signal to the conveyor system such that the conveyor system sends the non-compliant object to a bypass belt.

6. The target surface marking system of claim 1, wherein a machine learning algorithm to apply a neural network enhanced through a training data set which continuously learns and refines itself to improve quality of a pin-marker engraving.

7. The target surface marking system of claim 6, wherein the machine learning algorithm to reduce a duration of a marking operation of the pin marker.

8. The target surface marking system of claim 7, wherein the machine vision algorithm to improve identification of different sizes and shapes.

9. The target surface marking system of claim 1, wherein the objects of different shapes and sizes on the primary belt are engraved with different corresponding associated marking patterns respectively in a single sequence through an application of correspondingly different pin marking commands.

10. The target surface marking system of claim 1, wherein the digital camera is embedded in the pin marker.

11. A method of a marking device to engrave on a target object comprising:

generating a visual signal of a visual state of an object to be marked in real time using a digital camera;

transmitting the visual signal to a master controller in real time using the digital camera;

analyzing the visual state of the object from the received digital camera signal using the master controller;

comparing the visual state of the object with a library of known visual states in a database and archiving a visual shape and a design parameter of the object using the master controller;

comparing the visual state of the object with an archived shape and the design parameter of the previously marked object using the master controller;

comparing the random position and the random orientation of the object with the archived design parameter of the same shape and object using the master controller;

extracting the associated marking pattern and the desired marking location of the object using the master controller;

generating a marking command based on the marking pattern, the desired marking location, random position and random orientation of the object using a processor of the master controller;

transmitting the marking command from the master controller to a pin marker of the marking device; and marking the marking pattern onto the desired marking location of the target object in real time using the pin marker.

12. The method of the marking device of claim 11, wherein the marking pattern to be marked on the object is at least one of an image, a barcode, a label, a logo, a serial number and a text.

13. The method of the marking device of claim 11, wherein the material of the target object is at least one of a metal, a fiber, a wood, a glass, quartz, a ceramic, and steel.

14. The method of the marking device of claim 11, wherein the marking device is at least one of a dot peen marker and a scriber marker.

15. The method of the marking device of claim 11, wherein the design parameter of the object includes at least one of shape, structure, size, length, width, depth, orientation and position of the object.

16. A target surface marking system, comprising:
a computing device:
  to provide a marking pattern to engrave on the target surface, and
  to transmit the marking pattern;
a master controller with a processor and a memory coupled with the computing device:
  to analyze a visual state of an object from a digital camera signal using an image recognition algorithm, a machine vision algorithm, a database, and a data library,
  to compare the visual state of the object with a library of known visual states in the database and to archive a visual shape and a design parameter of the object,
  to compare the visual state of the object with an archived shape and the archived design parameter selected from a set of previously marked objects,
  to instantiate the machine vision algorithm to identify a corresponding shape and design patterns previously archived and stored in the data library of the database of the master controller,
  to compare a random position and a random orientation of the object with an archived design parameter of a same shape and a same object,
  to receive the marking pattern from the computing device in real time,
  to generate a marking command using the image recognition algorithm and the machine vision algorithm based on the position and the orientation of the object, and
  to send the marking command to a pin marker; and
a marking device comprising a digital camera and the pin marker:
  to generate a visual signal of the visual state of the object to be marked in real time using the digital camera;
  to transmit the generated digital camera signal in real time to the master controller using a digital camera;
  to receive the marking command using the pin marker from the master controller for marking the target surface; and
  to mark the marking pattern onto the desired marking location of the the target object in real time using the pin marker.

17. The target surface marking system of claim 16, wherein the computing device is at least one of a computer, a mobile device, a keyboard, and a touch-screen device to provide the marking pattern in the form of at least one of an image, a barcode, a label, a logo, a serial number and a text.

18. The target surface marking system of claim 16, wherein the digital camera to capture a pre-engraved marking pattern from the object on a conveyor system and transmit to the master controller for marking the same pre-engraved marking pattern for the objects having same visual shape and a design parameter.

19. The target surface marking system of claim 16,
wherein when only a specific marking is desired through the marking command, only allowing marking of a compliant object, and permitting the compliant object to move in a forward path, along a primary belt, and
if the object on the primary belt is non-compliant, meaning the object does not correspond to the marking command, to send a non-compliant signal to the conveyor system such that the conveyor system sends the non-compliant object to a bypass belt.

20. The target surface marking system of claim 16, wherein the objects of different shapes and sizes on the primary belt are engraved with different corresponding associated marking patterns respectively in a single sequence through an application of correspondingly different pin marking commands.

* * * * *